US010763910B2

(12) United States Patent
Nyholm (10) Patent No.: US 10,763,910 B2
(45) Date of Patent: Sep. 1, 2020

(54) CASE FOR A TABLET SHAPED DEVICE (71) Applicant: STM Management Pty Ltd, Alexandria, NSW (AU)

(72) Inventor: Ethan Nyholm, North Bondi, NSW (AU)

(73) Assignee: STM Management Pty Ltd, Alexandria, NSW (AU)

(*) Notice: Subject to any disclaimer, the term of this patent is extended or adjusted under 35 U.S.C. 154(b) by 140 days.

(21) Appl. No.: 16/117,149

(22) Filed: Aug. 30, 2018

(65) Prior Publication Data

US 2019/0356350 A1 Nov. 21, 2019

(30) Foreign Application Priority Data

May 18, 2018 (AU) ................. 2018901752

(51) Int. Cl.
*H04B 1/3888* (2015.01)
*H04M 1/21* (2006.01)
*H04M 1/02* (2006.01)
*A45C 13/02* (2006.01)
*A45C 11/00* (2006.01)

(52) U.S. Cl.
CPC .......... *H04B 1/3888* (2013.01); *A45C 11/00* (2013.01); *A45C 13/02* (2013.01); *H04M 1/0202* (2013.01); *H04M 1/21* (2013.01); *A45C 2011/003* (2013.01); *A45C 2013/025* (2013.01)

(58) Field of Classification Search
CPC ............................. H04B 1/3888; H04M 1/21
See application file for complete search history.

(56) References Cited

U.S. PATENT DOCUMENTS

| 59,618 | A | 11/1866 | Mahon |
| 2,528,695 | A | 11/1950 | King |
| 4,815,880 | A | 3/1989 | Sekiguchi |
| 5,180,891 | A * | 1/1993 | Trumbo .................. G06F 3/041 178/19.01 |
| D366,146 | S | 1/1996 | Bertrand |
| 5,498,089 | A | 3/1996 | Motyka |
| D385,299 | S | 10/1997 | Adams |
| 5,769,213 | A | 6/1998 | Chatterton |
| D410,951 | S | 6/1999 | Schwarzwaelder |
| 6,016,248 | A | 1/2000 | Anzai et al. |
| 6,301,101 | B1 | 10/2001 | Anzai et al. |
| 6,726,070 | B2 | 4/2004 | Lautner |
| D508,954 | S | 8/2005 | Cetera |
| 6,926,151 | B1 | 8/2005 | Starr et al. |
| D522,583 | S | 6/2006 | Goserud |
| 7,318,521 | B2 | 1/2008 | Lau |
| D645,505 | S | 9/2011 | Melnick |
| 8,132,670 | B1 | 3/2012 | Chen |
| D658,187 | S | 4/2012 | Dieel |
| 8,264,310 | B2 | 9/2012 | Lauder et al. |
| 8,344,836 | B2 | 1/2013 | Lauder et al. |
| D676,449 | S | 2/2013 | Probst et al. |
| D678,260 | S | 3/2013 | Bau |
| D679,715 | S | 4/2013 | Akana et al. |
| D681,641 | S | 5/2013 | Van Den Nieuwenhuizen et al. |
| 8,474,609 | B1 | 7/2013 | Hong et al. |
| D688,251 | S | 8/2013 | Akana et al. |
| D690,703 | S | 10/2013 | Welch et al. |

(Continued)

*Primary Examiner* — Hsinchun Liao
(74) *Attorney, Agent, or Firm* — Christensen, Fonder, Dardi & Herbert PLLC (57) ABSTRACT A case for a tablet-shaped device.

5 Claims, 6 Drawing Sheets

(56) References Cited

U.S. PATENT DOCUMENTS

| | | |
|---|---|---|
| 8,555,938 B2 | 10/2013 | Costello |
| D696,253 S | 12/2013 | Akana et al. |
| D696,669 S | 12/2013 | Akana et al. |
| 8,607,976 B2 | 12/2013 | Wu et al. |
| 8,672,126 B2 | 3/2014 | Rohrbach et al. |
| D702,673 S | 4/2014 | Murchison et al. |
| D704,769 S | 5/2014 | Penington |
| 8,714,351 B2 | 5/2014 | Toulotte |
| 8,724,300 B2 | 5/2014 | Smith et al. |
| 8,746,446 B2 | 6/2014 | Chiang |
| D708,621 S | 7/2014 | Gifford et al. |
| 8,807,333 B1 | 8/2014 | Cooper et al. |
| 8,817,457 B1 | 8/2014 | Colby et al. |
| D713,848 S | 9/2014 | Akana et al. |
| 8,833,819 B2 | 9/2014 | Chen |
| 8,878,637 B2 | 11/2014 | Sartee et al. |
| 8,928,437 B2 | 1/2015 | Lauder et al. |
| 8,944,715 B2 | 2/2015 | Yoder |
| D733,714 S | 7/2015 | Ballou et al. |
| D736,777 S | 8/2015 | Rayner |
| D744,745 S | 12/2015 | Fischer |
| 9,215,303 B2 | 12/2015 | Nyholm et al. |
| 9,225,814 B2 | 12/2015 | Nyholm et al. |
| 9,226,567 B2 | 1/2016 | Potter et al. |
| D755,504 S | 5/2016 | Thomson |
| D757,018 S | 5/2016 | Pearce |
| D757,731 S | 5/2016 | Nguyen et al. |
| D764,474 S | 8/2016 | Penn |
| D764,475 S | 8/2016 | Penn |
| D765,085 S | 8/2016 | Moore |
| 9,407,743 B1 | 8/2016 | Hirshberg |
| D775,132 S | 12/2016 | Smith et al. |
| D776,122 S | 1/2017 | Akana et al. |
| D776,123 S | 1/2017 | Akana et al. |
| D786,256 S | 5/2017 | Stewart |
| D786,881 S | 5/2017 | Stewart et al. |
| D789,936 S | 6/2017 | Nyholm |
| D792,884 S | 7/2017 | Nyholm |
| 9,748,999 B2 | 8/2017 | Nyholm et al. |
| D804,486 S | 12/2017 | Nyholm et al. |
| D812,621 S | 3/2018 | Nyholm et al. |
| 2004/0240164 A1 | 12/2004 | Lee |
| 2006/0007645 A1 | 1/2006 | Chen et al. |
| 2011/0267748 A1 | 11/2011 | Lane et al. |
| 2011/0309117 A1 | 12/2011 | Roberts |
| 2012/0088557 A1 | 4/2012 | Liang |
| 2012/0117467 A1* | 5/2012 | Maloney ............. G06Q 10/00 715/273 |
| 2012/0268891 A1 | 10/2012 | Cencioni |
| 2013/0020216 A1 | 1/2013 | Chiou |
| 2013/0048514 A1 | 2/2013 | Corcoran et al. |
| 2013/0048520 A1 | 2/2013 | Garrett et al. |
| 2013/0233762 A1 | 9/2013 | Balaji et al. |
| 2015/0001105 A1 | 1/2015 | Nyholm et al. |
| 2015/0263776 A1 | 9/2015 | Shyu et al. |
| 2015/0343831 A1* | 12/2015 | Ceruzzi ............... F16B 2/22 24/304 |

* cited by examiner

CASE FOR A TABLET SHAPED DEVICE

PRIORITY CLAIM

The present application claims priority to Australia Patent Application No. 2018901752, filed on May 18, 2018, which said application is incorporated by reference in its entirety herein.

TECHNICAL FIELD

The disclosure herein generally relates to a case for a tablet shaped device

BACKGROUND

Cases for tablet shaped devices, examples of which include the APPLE IPAD, SAMSUNG GALAXY TAB, LENOVO TAB, smartphones like the APPLE IPHONE, and some personal digital assistants, are commercially available.

Some tablet shaped devices are configured to be used with a stylus. In the context of the present application, the term stylus encompasses a hand-held tool used by a user to interact with a touch sensitive area (for example a touch sensitive screen) of a tablet shaped device. A stylus may, but not necessarily, comprise an elongated shaft having opposite ends and a touch sensitive area interaction tip at at least one of the opposite ends.

Commercially available cases for tablet shaped devices may not meet some of the needs of consumer needs, including but not limited to the need to conveniently store a stylus.

SUMMARY

Disclosed herein is a case for a tablet shaped device. The case comprises a body comprising a face having a tablet shaped device receiving area. The case comprises a stylus holder at a margin of the face. The stylus holder defines an elongate cavity for receiving either of a first stylus for the tablet shaped device and a second stylus for the tablet shaped device. The second stylus for the tablet shaped device has a different configuration than the first stylus.

In an embodiment, the stylus holder comprises at least one obstructing element arranged to obstruct removal of at least one of the first stylus for the tablet shaped device and the second stylus for the tablet shaped device from the elongate cavity when so received thereby. The at least one obstructing element may be attached to an elongate cavity wall that is outwardly bendable and resilient wherein the at least one obstructing element attached thereto is outwardly movable for removal of either of the first stylus for the tablet shaped device and the second stylus for the tablet shaped device from the elongate cavity. An optional discontinuity in the elongate cavity wall may provide finger access to either of the first stylus for the tablet shaped device and the second stylus for the tablet shaped device when so received.

In an embodiment, the stylus holder comprises a stylus tip receiver for receiving a tip of either of the first stylus and the second stylus. The stylus tip receiver may comprise a web defining a space for receiving the tip therein. The stylus tip receiver may define a passageway having an outwardly orientated opening and which opens into the space for ingress and egress of the tip into the space.

In an embodiment, the stylus tip receiver may comprise at least one resilient lip that at least partially closes the outwardly orientated opening whereby the at least one resilient lip hinders removal of the tip when so received. The outwardly orientated opening may be narrower than a width of the tip. The web may span the elongate cavity.

In an embodiment the stylus holder comprises a stylus cap receiver for receiving a cap of the second stylus. The stylus cap receiver may comprise a web defining a cradle configured to capture the stylus cap. The web may comprise at least one resilient lip that at least partially closes an outwardly orientated cradle opening whereby the at least one resilient lip hinders removal of the stylus cap when so received.

An embodiment comprises a back wall. The web may tapper into the back wall.

Disclosed herein is a case for a tablet shaped device. The case may comprise a body comprising a face having a tablet receiving area. The case may comprise a stylus holder at a margin of the face for holding a stylus for the tablet shaped device, the stylus holder defining an elongate cavity for receiving a stylus. The case may comprise a stylus tip receiver for receiving a tip of the stylus.

Any of the various features of each of the above disclosures, and of the various features of the embodiments described below, can be combined as suitable and desired.

BRIEF DESCRIPTION OF THE DRAWINGS

Embodiments will now be described by way of example only with reference to the accompanying figures in which.

DETAILED DESCRIPTION

Figure 4:
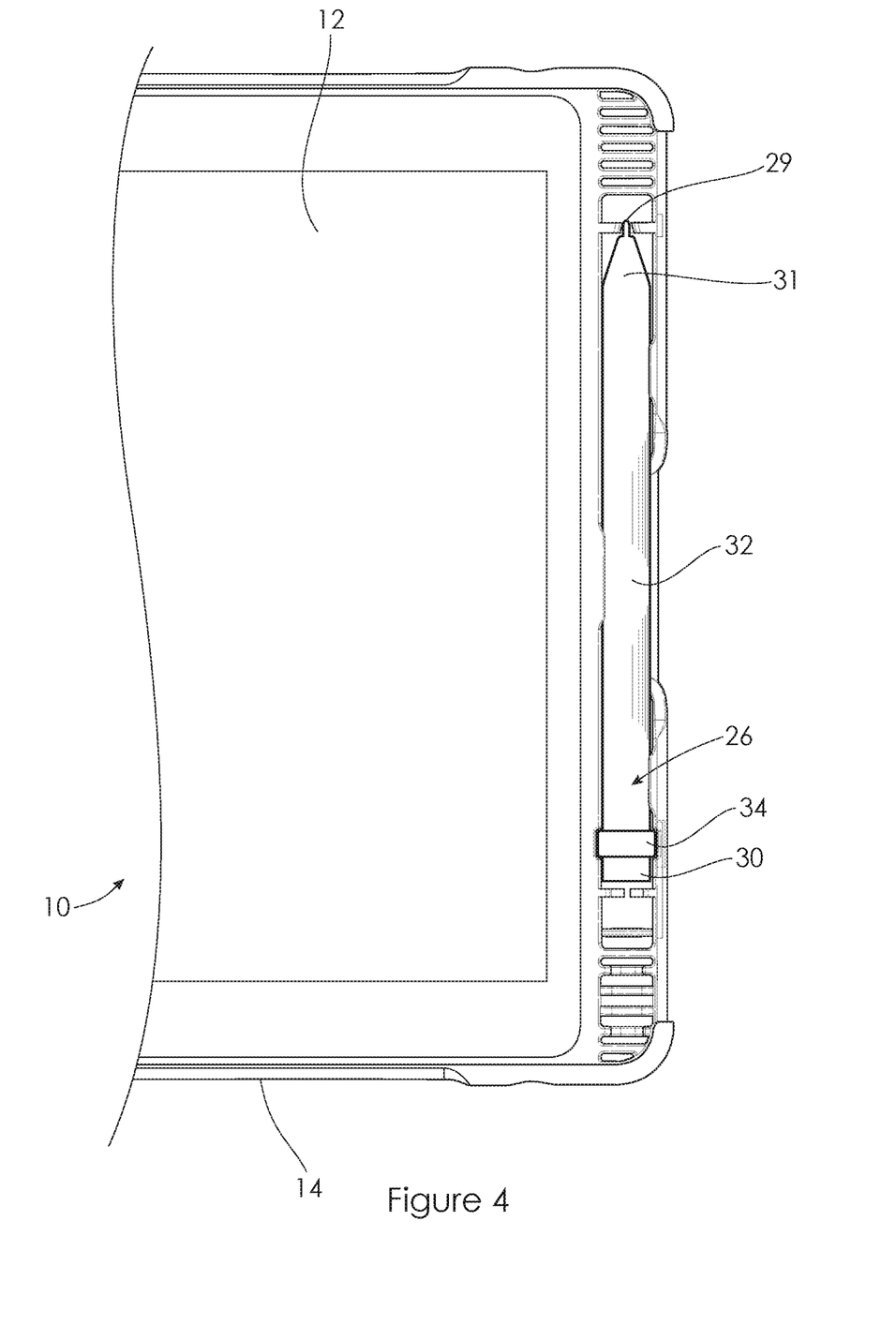
FIG. 4 shows a picture of a portion of the case of FIG. 1 in which a tablet shaped device and a first stylus are received thereby.
Figure 5:
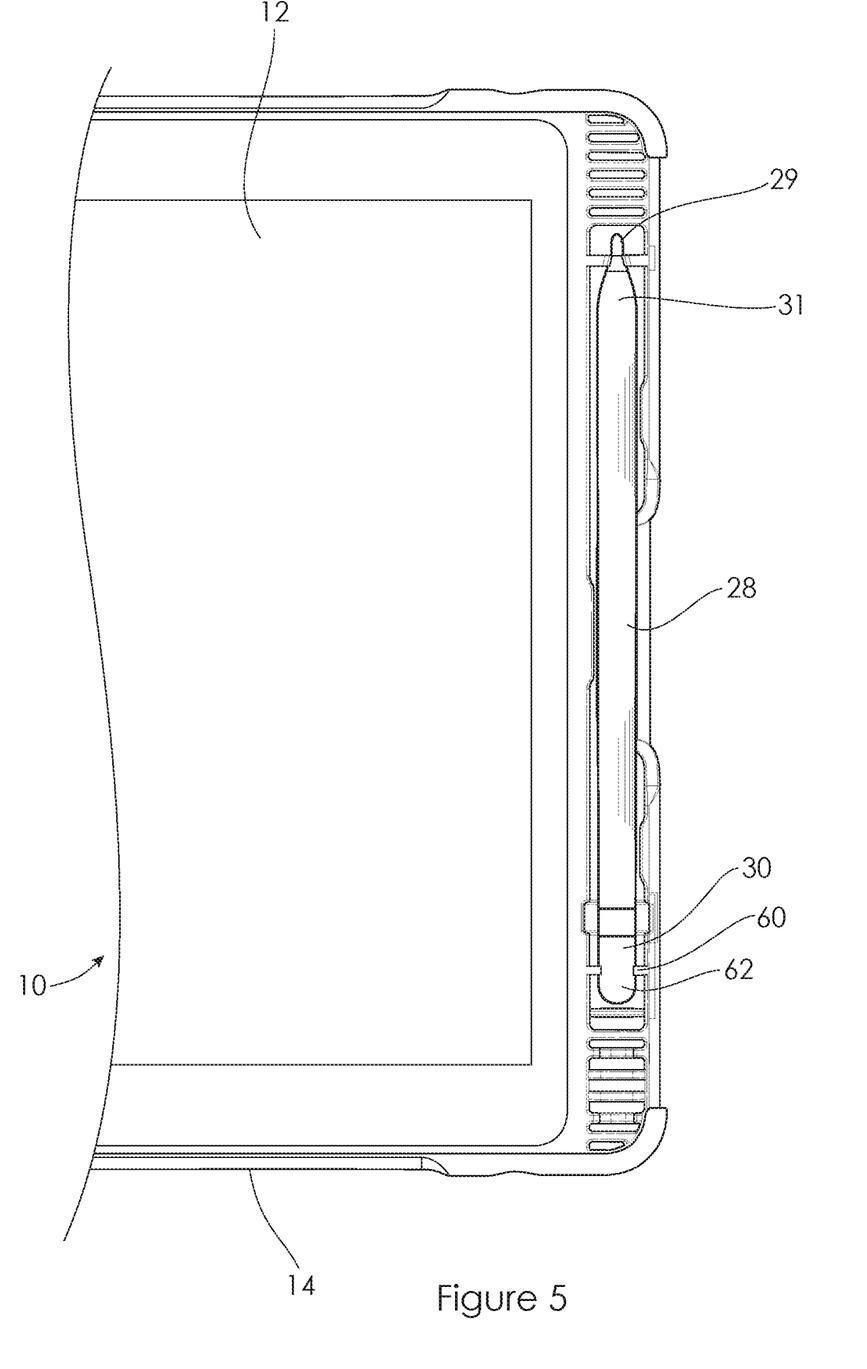
FIG. 5 shows a picture of a portion of the case of FIG. 1 in which the tablet shaped device and a second stylus are received thereby.
Figure 6:
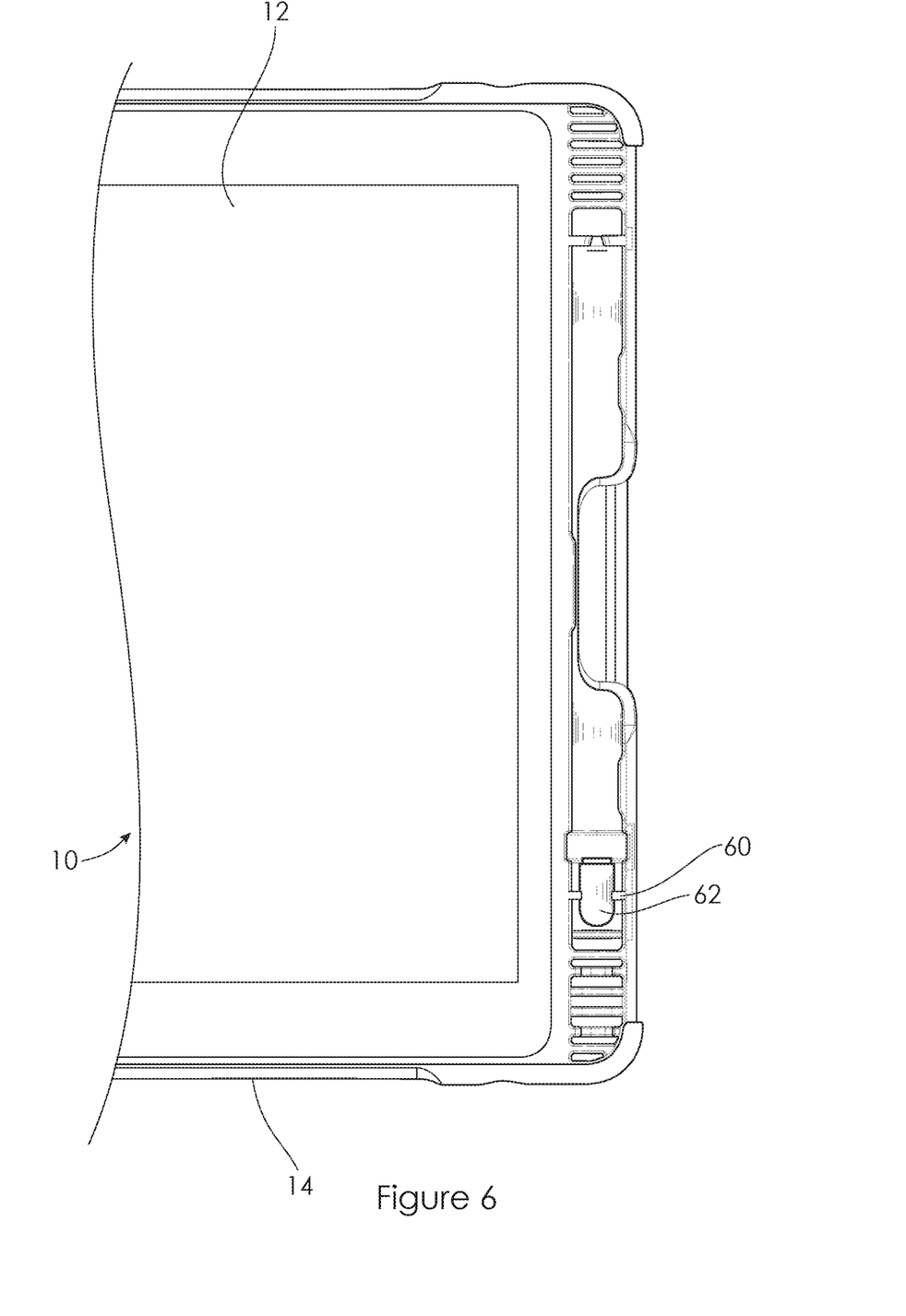
FIG. 6 shows a picture of a portion of the case of FIG. 1 in which the tablet shaped device and a cap of the second stylus are received thereby.

FIGS. 1 through 6 show various views of an embodiment of a case (indicated by numeral 10) for a tablet shaped device 12. The case 10 comprises a body 14 comprising a front face 16 having a tablet shaped device receiving area 18. The case 10 has a stylus holder 20 at a margin 22 of the face 16. The stylus holder 20 defines an elongate cavity 24. The stylus holder 20 can receive within the elongate cavity 24 a first stylus 26 for the tablet shaped device 12, as shown in FIG. 4. The stylus holder 20 can receive a second stylus 28 for the tablet shaped device 12, as shown in FIG. 5. The first stylus 26 has a different configuration than the second stylus 28.

The case 10 is configured for removable capture of either of the first stylus 26 and the second stylus 28 within the elongate cavity 24, and in doing so may accommodate the different configurations of the first stylus 26 and the second stylus 28.

The first stylus 26 has a two opposite ends 30, 31. One of the ends 31 comprises a tip 29 in the form of a touch sensitive area interaction tip. The other end 30 comprises a circumferential sidewall protuberance 34 in the form of a boss. Intermediate the two opposite ends 30,31 is an elongated stylus shaft 32 that can be held in a user's hand. Parts of the second stylus 28 that are similar and/or identical in form and/or function to parts of the first stylus 26 are similarly numbered.

The stylus holder 20 comprises at least one obstructing element 36, 40—in this embodiment two obstructing elements, however other embodiments may have one or more than two obstructing elements—arranged to obstruct removal of at least the first stylus 26 from the elongate cavity 24 when so received thereby. The obstructing elements 36,40 narrow the opening of the stylus holder 20. Each of the obstructing elements 36,40 are in the form of a rib parallel to the elongated cavity 24, however at least one of the obstructing elements may be in the form of a semi-sphere or generally take any suitable form. Obstructing elements 38,40 may assist in the capture of the stylus 26,28. That is, the first stylus 26 is captured within the elongate cavity 24 by the obstructing elements 36,40. The obstructing elements 36,40 are attached to elongate cavity wall 42 that is outwardly bendable and resilient. The obstructing elements 36,40 attached to the elongate cavity wall 42 are outwardly movable for removal of the first stylus 26 from the elongate cavity 20. A discontinuity 44 in the elongate cavity wall 42 provides finger access to either of the first stylus 26 and the second stylus 28 when so received.

Figure 1:
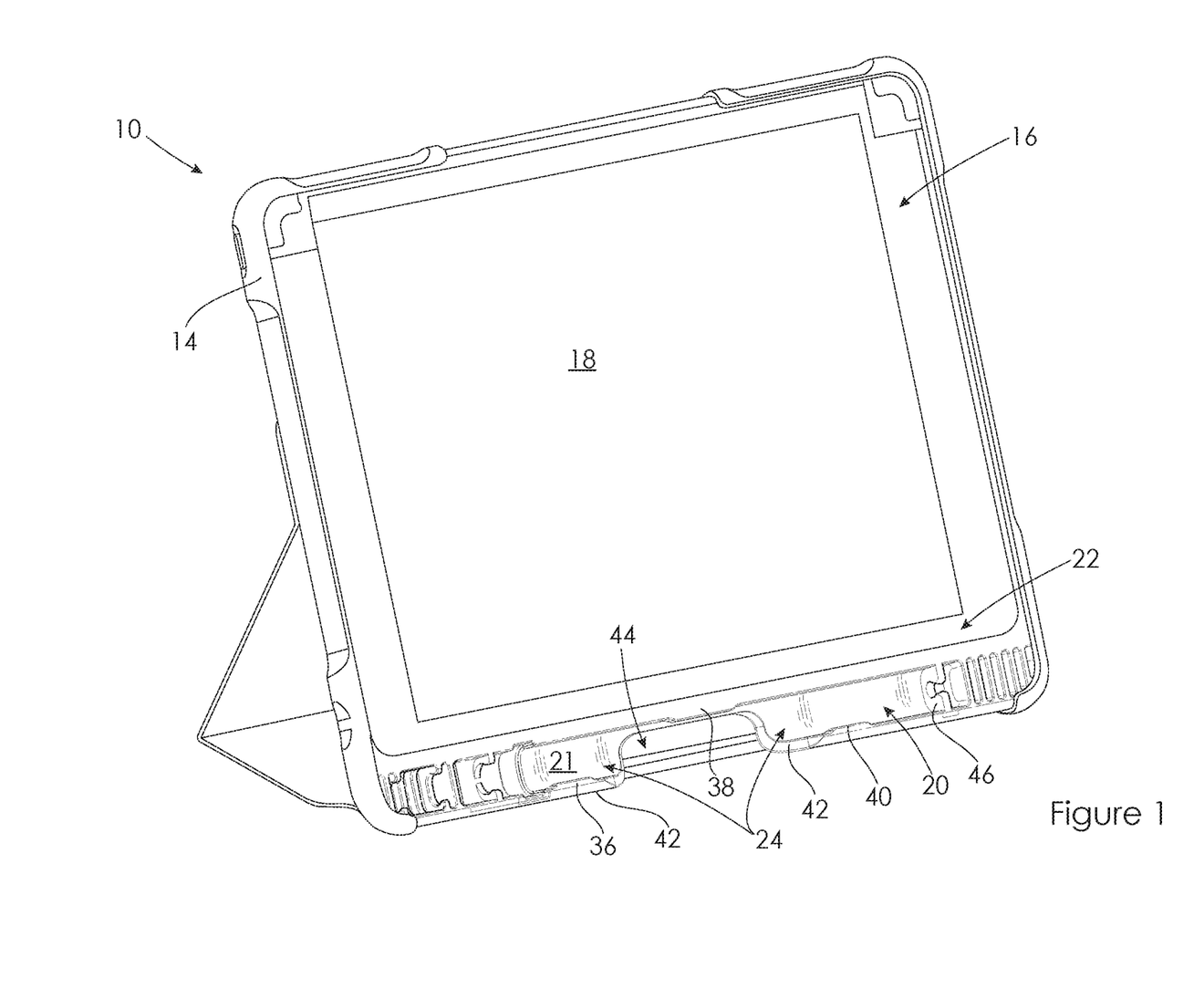
FIG. 1 shows a perspective view of an embodiment of a case for a tablet shaped device and a stylus.
Figure 2:
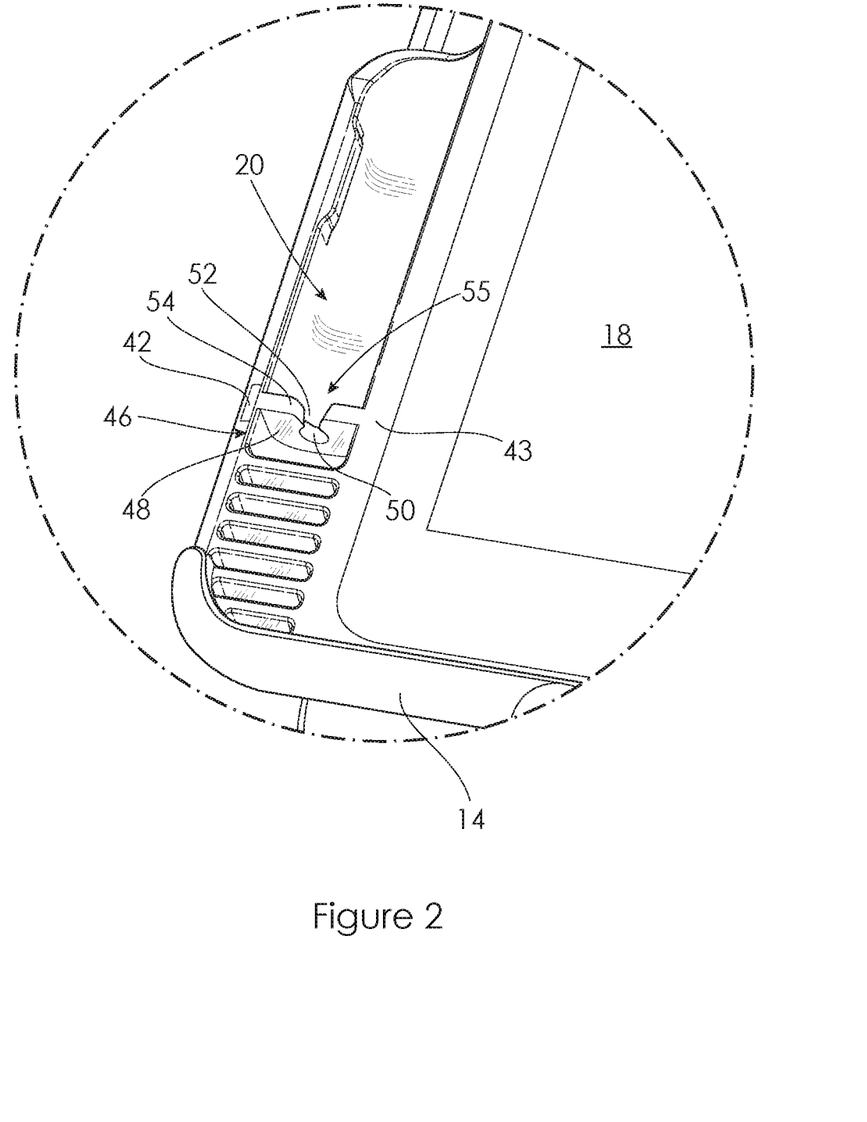
FIG. 2 shows a detail of a stylus tip receiver of the case of FIG. 1.
Figure 3:
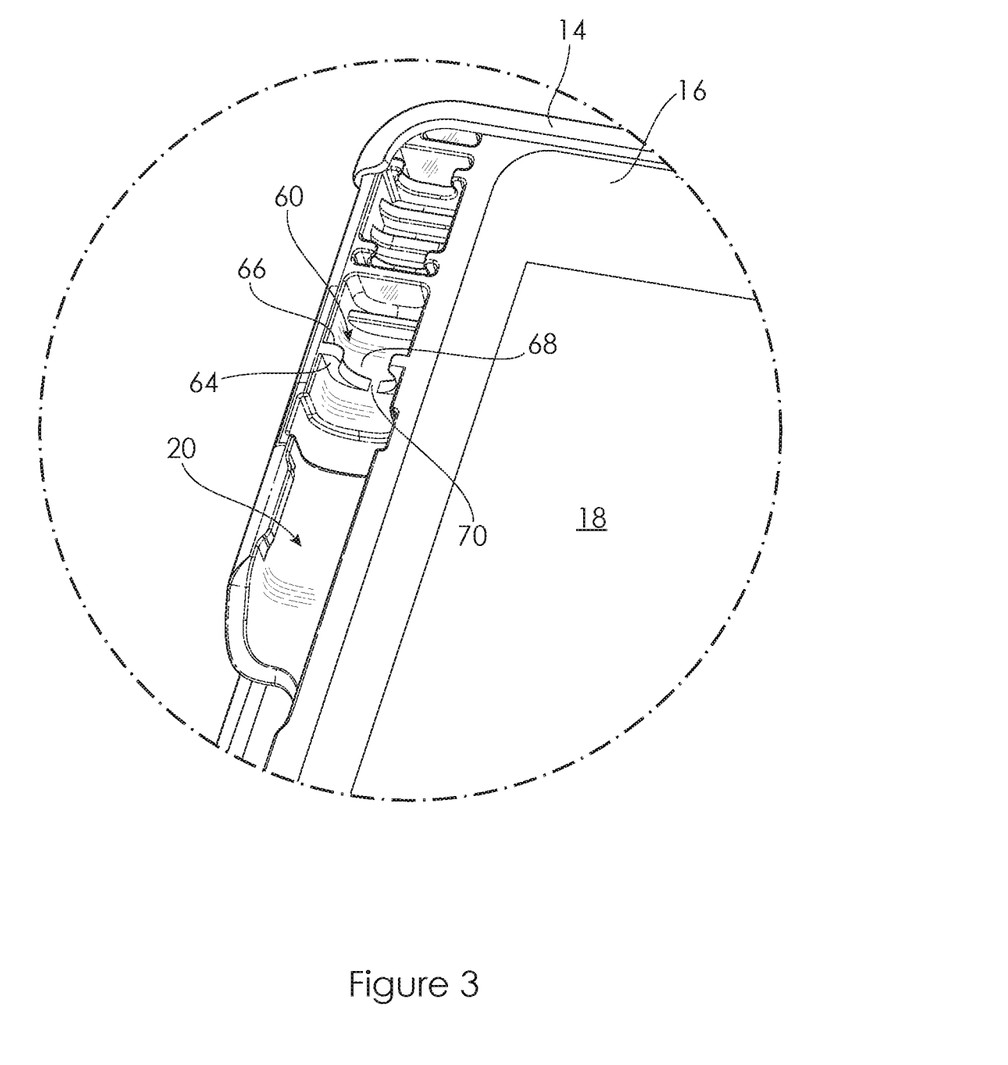
FIG. 3 shows a detail of a stylus cap receiver of the case of FIG. 1.

The stylus holder 20 comprises a stylus tip receiver 46, best understood with reference to FIG. 2. The stylus tip receiver 46 is for receiving a tip 29 of either of the first stylus 26 and the second stylus 28. The stylus tip receiver 46 comprises a web 48 defining a space 50 for receiving the tip 29 of either of the first stylus 26 and the second stylus 28 therein. The stylus tip receiver 46 defines a passageway 52 having an outwardly orientated opening 55 and which opens into the space 50 for ingress and egress of the tip 29 into the space 50. The stylus tip receiver 46 comprises at least one resilient lip 54 in this embodiment one either side of the opening 55, that at least partially closes the outwardly orientated opening 55 whereby the at least one resilient lip 54 hinders removal of the tip 29 when so received. The outwardly orientated opening 52 is narrower than a width of the tip of either of the first stylus 26 and the second stylus 28. The web 48 spans the elongate cavity 20, between outer cavity wall 42 and inner cavity wall 43, however in other embodiments it may not, and may be interrupted so as to consist of two web components, for example.

The second stylus 28 has an electrical connector under cap 62 for charging, which is revealed for use by removal of the cap 62. The stylus holder 20 comprises a stylus cap receiver 60, best understood with reference to FIGS. 3 and 6. The stylus cap receiver 60 is for receiving a cap 62 of the second stylus 28. The stylus cap receiver 60 comprises another web 64 defining a cradle configured to capture the stylus cap 62 to the case 10. In this embodiment, the cradle holds the stylus cap 62 when received thereby but it may not in other embodiments. The stylus cap receiver 60 comprises at least one other resilient lip 66 that at least partially closes an outwardly orientated cradle opening 68 whereby the at least one resilient lip 66, in this embodiment two other resilient lips, hinder removal of the stylus cap 62 when so received. The web 64 tappers into the back wall 70 of the case 10, which may provide the necessary space for the cap, and may be aesthetically pleasing.

The first stylus 26 is shorter than the second stylus 28. The stylus cap receiver 60 is disposed outside of a first stylus receiving area of the elongate cavity 24 that is between the stylus cap receiver 60 and the tip receiver 46. Consequently, the stylus cap receiver 60 does not interfere with insertion of the first stylus 26 into the elongate cavity 24.

Now that embodiments have been described, it will be appreciated that some embodiments may have some of the following advantages:

The first stylus, for example, may be a different brand stylus than that of the second stylus. A consumer may wish to choose which brand of stylus to purchase without selecting a special case that only accommodates the chosen brand of stylus. Embodiments may accommodate this.

A consumer may wish to stop using the first stylus with the tablet shaped device in case 10 and commence using the second stylus with the tablet shaped device in the case 10, for example. Embodiments may accommodate this.

A cap may be captured while a stylus is being recharged, for example, which may prevent loss, for example.

Variations and/or modifications may be made to the embodiments described without departing from the spirit or ambit of the invention. The present embodiments are, therefore, to be considered in all respects as illustrative and not restrictive. Reference to a feature disclosed herein does not mean that all embodiments must include the feature.

Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

The invention claimed is:

1. A case for a tablet shaped device, the case comprising:
   a body comprising a face having a tablet shaped device receiving area, and
   a stylus holder at a margin of the face, the stylus holder defining an elongate cavity for receiving either of a first stylus for the tablet shaped device and a second stylus for the tablet shaped device, the second stylus for the tablet shaped device having a different configuration than the first stylus for the tablet shaped device;
   wherein the stylus holder comprises a stylus tip receiver for receiving a tip of either of the first stylus and the second stylus, the stylus tip receiver comprises a web defining a space for receiving the tip therein, the stylus tip receiver defining a passageway having an outwardly orientated opening and which opens into the space for ingress and egress of the tip into the space, and the stylus tip receiver comprises at least one resilient lip that at least partially closes the outwardly orientated opening whereby the at least one resilient lip hinders removal of the tip when so received.

2. A case defined by claim 1 wherein the outwardly orientated opening is narrower than a width of the tip.

3. A case for a tablet shaped device, the case comprising:
   a body comprising a face having a tablet shaped device receiving area,
   a stylus holder at a margin of the face, the stylus holder defining an elongate cavity for receiving either of a first stylus for the tablet shaped device and a second stylus for the tablet shaped device, the second stylus for the tablet shaped device having a different configuration than the first stylus for the tablet shaped device;

wherein the stylus holder comprises a stylus cap receiver for receiving a cap of the second stylus, the stylus cap receiver comprising a web defining a cradle configured to capture the stylus cap and the stylus cap receiver comprises at least one resilient lip that at least partially closes an outwardly orientated cradle opening wherein the at least one resilient lip hinders removal of the stylus cap when so received.

4. A case defined claim 3 comprising a back wall wherein the web tapers into the back wall.

5. A case for a tablet shaped device, the case comprising:
a body comprising a face having a tablet shaped device receiving area, and
a stylus holder at a margin of the face, the stylus holder defining an elongate cavity for receiving either of a first stylus for the tablet shaped device and a second stylus for the tablet shaped device, the second stylus for the tablet shaped device having a different configuration than the first stylus for the tablet shaped device;
wherein the stylus holder comprises:
a stylus cap receiver for receiving a cap of the second stylus
a stylus tip receiver for receiving a tip of either of the first stylus and the second stylus; and
at least one obstructing element intermediate the stylus cap receiver and the stylus tip receiver and comprising at least one obstructing element arranged to obstruct the removal of either of the first stylus for the tablet shaped device and the second stylus for the table shaped device from the elongate cavity when so received thereby.

* * * * *